Figure 1:
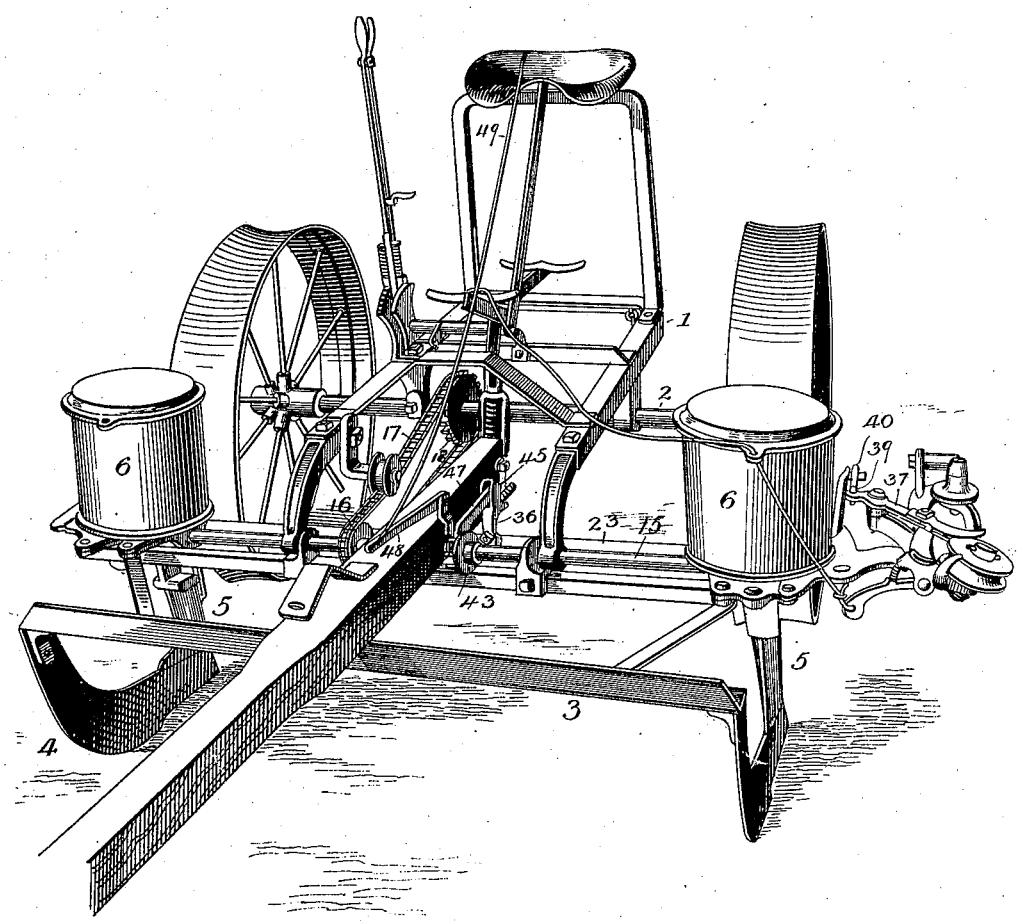

(No Model.)

A. LINDGREN.
SEEDING MACHINE.

No. 577,437.  3 Sheets—Sheet 1.

Patented Feb. 23, 1897.

Witnesses:
F. J. Elmore.
G. M. Copenhaver.

Inventor:
August Lindgren
By P. T. Dodge
Atty.

(No Model.) 3 Sheets—Sheet 2.
A. LINDGREN.
SEEDING MACHINE.
No. 577,437. Patented Feb. 23, 1897.
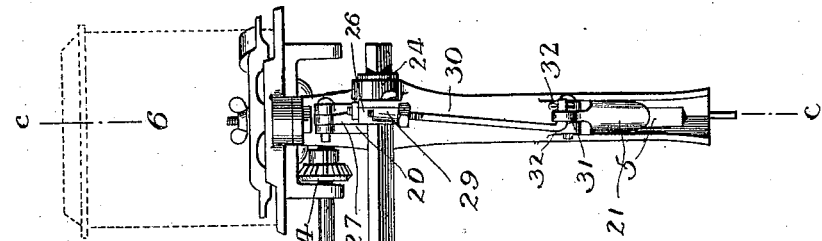
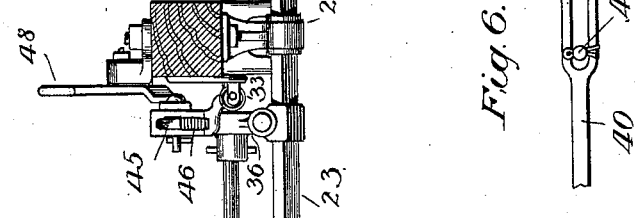
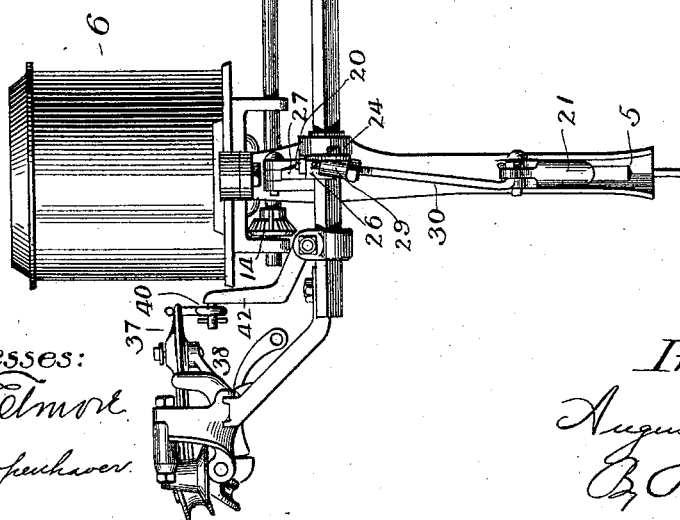
Witnesses:
Inventor:

(No Model.) 3 Sheets—Sheet 3.
A. LINDGREN.
SEEDING MACHINE.
No. 577,437. Patented Feb. 23, 1897.
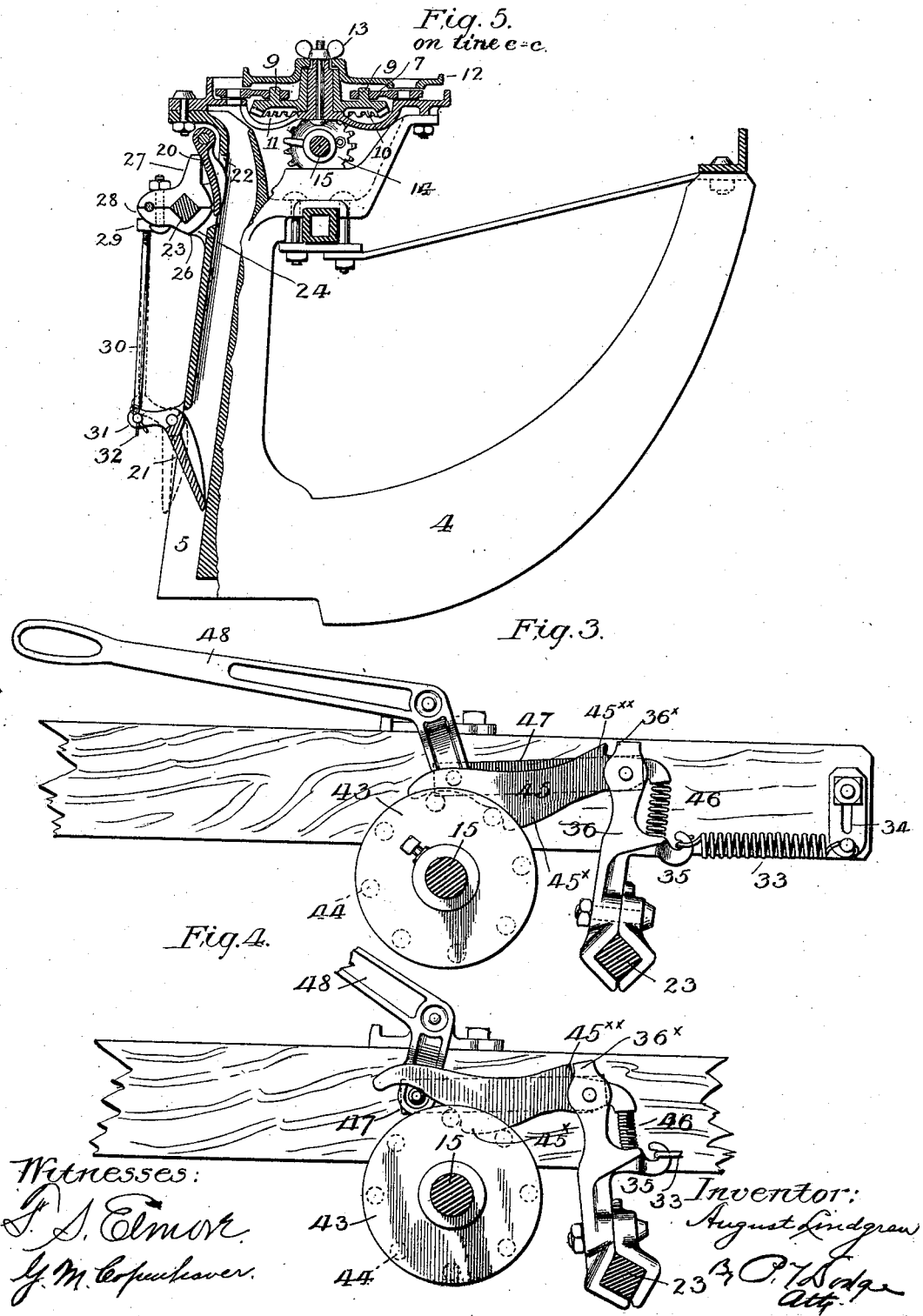
Witnesses:
F. S. Elmore
G. M. Copenhaver
Inventor:
August Lindgren
by P. T. Dodge
Atty

UNITED STATES PATENT OFFICE.

AUGUST LINDGREN, OF MOLINE, ILLINOIS, ASSIGNOR TO THE MOLINE PLOW COMPANY, OF ILLINOIS.

SEEDING-MACHINE.

SPECIFICATION forming part of Letters Patent No. 577,437, dated February 23, 1897.

Application filed April 30, 1895. Serial No. 547,633. (No model.)

*To all whom it may concern:*

Be it known that I, AUGUST LINDGREN, of Moline, county of Rock Island, and State of Illinois, have invented a new and useful Improvement in Seeding-Machines, of which the following is a specification.

My invention has reference to seeding-machines, and relates more particularly to corn-planters; and it consists in various improved features of construction and arrangements of parts designed to render the machine available for either drilling the corn continuously or checking the same at intervals in hills, as desired.

In the accompanying drawings, Figure 1 is a perspective view of a corn-planting machine having my invention embodied therein. Fig. 2 is a vertical transverse sectional elevation of the runner-frame as viewed from the rear. Fig. 3 is a sectional elevation, on an enlarged scale, of the driving connections between the rock-shaft and operating-shaft. Fig. 4 is a similar view with the parts in different positions. Fig. 5 is a vertical longitudinal section through the seed-hopper, seed-discharging mechanism, and adjacent parts on the line *c c* of Fig. 2. Fig. 6 is an elevation of the connection between the rocking lever and rock-shaft.

In the drawings, 1 represents a frame sustained by ground-wheels mounted on an axle 2, journaled in bearings in the frame. At its front this frame is jointed to a runner-frame 3, comprising two runners 4, connected together, as usual, at their forward ends by a transverse connecting-bar and formed with vertical seed-tubes 5 at their rear ends, which tubes are surmounted by seed-hoppers 6, provided in their bottoms with suitable seed-discharging mechanism adapted to deliver the seed or corn in the upper ends of the tubes, whence it falls to the ground. This runner-frame has fixed to it a tongue which extends rearward and terminates at the front of the wheeled frame, the connections between the two being jointed to the rear end of the tongue.

The seeding mechanism comprises, as usual, a rotary dropper-plate 7, provided with a series of holes to receive the kernels, which are carried by said plate over a discharge-hole in the bottom of the hopper communicating with the seed-tubes. The dropper-plate is provided with two holes near its center which receive pins 9, projecting upward from a horizontal gear-wheel 10, journaled in the center of the hopper and provided on its under side with a series of gear-teeth 11. The dropper-plate is confined in place by an overlying cut-off plate 12, removably held in place by a thumb-screw 13 or by other suitable means.

The dropper-plates are rotated by means of two vertical bevel-gears 14, fixed to the opposite ends of a horizontal transverse shaft 15, which is mounted in suitable bearings depending from the under side of the hoppers, the said gears meshing with the teeth on the under side of the gear 10, before alluded to.

The operating-shaft 15 is provided with a sprocket-wheel 16, which is driven by a chain 17 from a sprocket-wheel 18, fixed to the axle, the rotation of the ground-wheels thereby serving to drive the operating-shaft and rotate the corn dropper-plates continuously. The speed of the dropper-plates and the number of kernels delivered to the seed-tubes may be varied by substituting for the sprocket-wheels on the axle and operating-shaft sprocket-wheels of different sizes. So also the number of kernels delivered by the dropper-plates into the tubes may be varied by substituting plates with holes differing in size from the others in the plates, it being preferable to provide plates of different thicknesses according as to the number of kernels it is desired shall be carried in a single hole.

Each of the seed-tubes is provided with two valves 20 and 21, journaled at the upper and lower ends of the tubes, respectively. The upper valve is in the form of a plate pivoted at its rear end on a horizontal axis to the under side of the hopper at its rear and projecting through an opening 22 in the rear side of the seed-tube, the size and arrangement of the valve being such that when swung up on its axis into the tube it will close the opening therein and receive any seed delivered by the dropper-plate. The lower valve is similarly journaled on a horizontal axis and swings through the open rear side of the tube and is arranged to close the opening through the tube and receive the seed from the discharging mechanism and from the valve 20. These valves are adapted to be operated at intervals to discharge the accumulated seed delivered into the tubes by the continuously-rotating dropper-plates, and their arrangement and operation are such that the lower valve normally closes the opening in the tube and receives the seed from the dropper-plate, the upper valve being normally open to permit the same to pass. At intervals by suitable mechanism (presently to be described) these valves are changed in position, the lower one opening and delivering the accumulated seed to the ground, while the upper one at the same time closes the opening in the tube and receives any seed delivered from the hopper in the meantime. Immediately after the dropping of the seed the lower valve is again closed and the upper one opened, the former receiving the seed from the upper valve and the seed from the hopper until the parts are again operated to open the lower valve to discharge the accumulated seed to the ground.

The movements of the valves in the manner described are effected by a horizontal rock-shaft 23, which extends transversely of the machine in rear of the seed-tubes near their upper ends, the shaft being mounted in suitable bearings 24 on the rear sides of the tubes, and a bearing 25, fixed to the tongue of the machine. The rock-shaft is provided at opposite ends immediately in rear of the upper valves with collars 26, fixed rigidly thereto, and each collar has projecting from its upper side a radial finger 27, against the end of which the upper valve rests when in its normal open position, the rocking of the shaft causing the fingers to swing the valves upward on their pivots and close the openings in the tubes. The collars are also provided each with a rearwardly-extending lug 28, having a hole in which is loosely engaged a laterally-bent finger, projecting from a vertical sleeve 29, threaded internally, into which is screwed the upper end of a vertical rod 30. The lower end of this rod is bent laterally and extended loosely through an opening in a lug 31 on the upper end of the lower valve, the end of said rod being prevented from disengagement from the valve by a cotter-pin 32, passed through an opening therein. The relative arrangement of the parts is such that when the upper valve normally rests in an open position against the end of its actuating-finger the lower valve will be held closed by its actuating-rod. By screwing the upper end of the rod into the threaded sleeve I am enabled to adjust the parts so that the lower valve will be held open, as shown in dotted lines in Fig. 5, which is desirable in certain cases, presently to be described.

The rock-shaft 23 is held normally in a position to hold the upper valve open by a spiral spring 33, having one end connected to the lower end of a slotted plate 34, bolted to the side of the tongue, and its opposite end connected to a rearwardly-projecting lug 35 on an arm 36, which latter is fixed to the rock-shaft, as plainly shown in Fig. 3.

The rock-shaft may be moved at intervals to operate the valves by any suitable means; but I prefer to employ a rocking lever 37, pivoted between its ends on a vertical axis to a check-head 38, the outer end of the lever being forked, as usual, to receive the knotted check-wire, which is guided by the head, while the inner end of the lever is formed with a hole, through which is extended a laterally-bent finger, projecting from the side of a sleeve 39. This sleeve is connected to the forward end of a rod 40, the rear end of said rod being provided with an elongated slot, through which extends a lateral pin, fixed to the upper end of an arm 42, having its lower end fixed to the rock-shaft. As the machine advances the check-wire will act in the usual manner to throw the free end of the rocking lever to the rear, and when the knot on the wire disengages the lever the spring 33, acting on the rock-shaft, will, through its connection with the rocking lever, restore the same to its former position ready to be engaged by the succeeding knot on the wire. This action on the lever and spring will rock the shaft back and forth and alternately open and close the valves in the seed-tubes, thereby dropping the accumulated seed at intervals corresponding to the hills.

From the foregoing description it will be observed that the seed-dropping mechanism is operated from the ground-wheels and that the check-wire serves only to open the valves at the proper time to drop the accumulated seed to the ground. As a result of this arrangement the check-wire and check-head are relieved of the severe strains to which they would be subjected were they connected to operate the seeding mechanism, as is usually the case.

As a further result of the arrangement described I am enabled to adjust the parts so that the machine will drill continuously in a manner similar to a grain-drill. This is effected by screwing the rods 30, connecting the valves, upward into the sleeves 29 and to such positions that the lower valves will be held open, the result being that the continuous rotating operating-shaft will deliver the seed continuously through the medium of the dropper-plates into the tubes as the machine advances. In this case the checking mechanism is not employed. Further, I am enabled to adjust the parts so that the machine may be used as a "check-rower," the seeding mechanism being operated at intervals by the check-wire in the customary manner. This result is effected by disconnecting the sprocket-chain from the operating-shaft and providing a suitable driving connection between the rock-shaft and operating-shaft, so that the operation of the rocking lever by the check-wire will rotate the operating-shaft intermittently and discharge the seed at intervals. The connection between these shafts consists of a wheel 43, fixed to the operating-shaft 15, adjacent to the arm 36, before alluded to. This wheel is formed with a series of laterally-extending pins 44, arranged in a circle near its periphery, which pins are engaged by the forward end of a pawl 45, pivoted at its rear end to the upper end of the arm 36 and acted on by a spiral spring 46, seated between the lug 35 on said arm and the under side of the end of the pawl. This spring tends to throw the forward end of the pawl downward onto the pins on the wheel and allows it to yield upwardly as the wheel is advanced thereby and permits the wheel to be moved freely independently of the rock-shaft. When the shaft is rocked by the rocking lever, this pawl is pushed forward, and its end engaging the pins on the wheel the latter will be advanced step by step and will operate the dropper-plates to discharge the corn at intervals into the seed-tubes.

The pawl 45 is provided on its under edge with a nose $45^\times$ and on its upper edge near its rear end with a shoulder $45^{\times\times}$, which latter is arranged to be encountered by a stop $36^\times$ on the arm 36 when the arm is thrust forward with the pawl in an elevated position. When in this position, the nose $45^\times$ will extend between the adjacent pins on the wheel, as shown in Fig. 4, and will serve to lock the wheel, as it were, thereby preventing the movement of the operating-shaft by momentum or its recoil. On the rearward movement of the rock-shaft the pawl will be retracted, and, moving from the center of the shaft as an axis, the nose of the pawl will extend in such a path as to free itself of the pin and will assume the position shown in Fig. 3.

In order to provide for the operation of the seeding mechanism by hand, as is frequently necessary at the ends of the rows in turning the machine, I connect the upper end of the arm 36 by a forwardly-extending horizontal link 47 to the lower end of an elbow-lever 48, pivoted to the side of the tongue. The upper end of this lever has connected to it a cord 49, which is extended to a point within easy reach of the driver.

By slotting the rear end of the rod 40, as before described, the operation of the seeding mechanism by the hand-lever will not cause the movement of the rocking lever 37.

While I have shown and described means for operating the drive-shaft of a seeding mechanism, consisting of a wheel fixed to said shaft and provided with a series of lateral pins, a rock-shaft, an arm fixed to the rock-shaft, a pawl pivoted to the arm and provided with a nose or projection adapted to extend between the pins on the wheel when the pawl is advanced, and a stop carried by said arm in position to be engaged by and to limit the movement of the pawl on its pivot, I lay no claim to the same.

Having thus described my invention, what I claim is—

1. In a seeding-machine the combination with a wheeled frame, of seed-hoppers sustained thereby at the front, a driver's seat at the rear of the frame, seed-discharging mechanisms in said hoppers, a rotary shaft for operating said mechanisms from the ground-wheels, a rock-shaft adjacent to the rotary shaft, driving mechanism carried by the rock-shaft and serving to give motion to the rotary shaft independently of the ground-wheels, a lever pivoted to the frame and connected to the driving mechanism and a cord or chain connected to said lever and extended to the driver's seat.

2. In a seeding-machine the combination with a wheeled frame, of seed-hoppers sustained thereby, seeding mechanisms in said hopper, a rotary shaft adapted to operate said mechanisms from the ground-wheels, a rocking arm adjacent to the rotary shaft, a driving-pawl pivoted to the upper end of the arm, a wheel on the rotary shaft adapted to be driven through the pawl by the rocking of the arm, a manually-operated lever pivoted to the frame and suitable connections between the lever and the arm; whereby the operation of the lever will serve, through the rocking arm and pawl, to operate the rotary operating-shaft independently of the ground-wheels.

3. In a seeding-machine the combination with a wheeled frame, of the seed-hoppers sustained thereby, seeding mechanisms located in said hoppers, a rotary shaft for operating said mechanisms from the ground-wheels, a rock-shaft mounted on the frame adjacent to the rotary shaft, a vertical arm connected to said rock-shaft, a pawl pivoted to the upper end of the arm, a wheel on the rotary shaft having pins or lugs adapted to be engaged by the pawl on the advance of the arm, a spring acting on the arm and tending to hold the same in a retracted position, a lever 48 pivoted to the frame and a link 47 connecting the end of said lever with the end of the arm.

4. In a seeding-machine the combination with the seed-discharging mechanism, of the seed-tube into which it discharges, a normally open valve in said tube, a normally closed valve located beneath the same, adjustable connections between said valves, and means for operating the valves at intervals.

5. In a seeding-machine the combination with the seed-discharging mechanism, of the seed-tube into which it discharges, a normally open valve in the upper part of said tube, a rock-shaft, a collar 26 fixed to said shaft, and provided with a radial finger to operate the valve, a lug on said collar formed with a hole, a vertical sleeve 29 formed with a laterally-projecting finger extending in said hole, said sleeve being threaded internally, a vertical rod screwed into said sleeve at its upper end, and a normally closed valve in the lower part of the tube pivoted to the lower end of said rod.

6. In a seeding-machine the combination with the frame, of the seed-hopper sustained thereby, seed-discharging mechanism in said hopper, a seed-tube in position to receive the seed from the hopper, a normally open valve in the upper part of the tube, a rock-shaft provided with a finger to engage said valve, a normally closed valve in the bottom of the tube, connections between the two valves, and means for rocking said shaft to close the upper valve and simultaneously open the lower valve and vice versa.

7. In a seeding-machine the combination with a wheeled frame, of seed-hoppers sustained thereby, seeding mechanisms in said hoppers, seed-tubes into which said mechanisms discharge, a rotary shaft for operating said mechanisms, connections for driving said shaft continuously from the ground-wheels, a rock-shaft, a normally open and a normally closed valve in the seed-tubes, adjustable connections between the said valves, connections between the rock-shaft and valves for operating them alternately to open and close the seed-tubes, a rocking lever adapted to be operated by the check-line, and connections between said lever and the rock-shaft for rocking the latter; whereby the machine may be employed to drop the corn at intervals by operating the valves, or the latter may be adjusted to permit the corn to be dropped continuously in rows.

In testimony whereof I hereunto set my hand, this 28th day of March, 1895, in the presence of two attesting witnesses.

AUGUST LINDGREN.

Witnesses:
F. G. ALLEN,
A. W. WAY.